(12) United States Patent
Arefjord

(10) Patent No.: US 12,337,265 B2
(45) Date of Patent: Jun. 24, 2025

(54) TREATMENT OF MULTIPHASE HYDROCARBON-CONTAINING FLUID IN OIL AND/OR GAS PRODUCTION

(71) Applicant: FourPhase AS, Os (NO)

(72) Inventor: Anders Arefjord, Os (NO)

(73) Assignee: FOURPHASE AS, Os (NO)

( * ) Notice: Subject to any disclaimer, the term of this patent is extended or adjusted under 35 U.S.C. 154(b) by 467 days.

(21) Appl. No.: 17/793,984

(22) PCT Filed: Jan. 31, 2020

(86) PCT No.: PCT/EP2020/052504
§ 371 (c)(1),
(2) Date: Jul. 20, 2022

(87) PCT Pub. No.: WO2021/151515
PCT Pub. Date: Aug. 5, 2021

(65) Prior Publication Data
US 2023/0040989 A1    Feb. 9, 2023

(51) Int. Cl.
*B01D 21/02* (2006.01)
*B01D 17/02* (2006.01)
(Continued)

(52) U.S. Cl.
CPC ......... *B01D 21/10* (2013.01); *B01D 17/0214* (2013.01); *B01D 17/12* (2013.01);
(Continued)

(58) Field of Classification Search
None
See application file for complete search history.

(56) References Cited

U.S. PATENT DOCUMENTS

| 5,680,899 A | 10/1997 | Waid et al. |
| 6,234,030 B1 | 5/2001 | Butler |

(Continued)

FOREIGN PATENT DOCUMENTS

| GB | 2561570 A | 10/2018 |
| WO | 2001/87453 A2 | 11/2001 |
| WO | 2017/137272 A1 | 8/2017 |

OTHER PUBLICATIONS

International Search Report and Written Opinion in related international application PCT/EP2020/052504 issued on Jan. 21, 2021.
(Continued)

*Primary Examiner* — Richard C Gurtowski
(74) *Attorney, Agent, or Firm* — POLSINELLI PC

(57) ABSTRACT

An apparatus for treating a multiphase hydrocarbon-containing fluid in an oil and/or gas production facility, the apparatus comprising: (a) an inlet for a multiphase hydrocarbon-containing fluid, wherein the inlet comprises a first pipe network configured to be connectable to a plurality of oil well heads in an oil field; (b) a separation system comprising: (i) a solids separator in fluid communication with the inlet; (ii) a solids outlet connected to the solids separator; (iii) a fluid separator in fluid communication with the solids separator, the fluid separator being configured to separate the remaining multiphase hydrocarbon-containing fluid into an oil phase, a water phase and a gas phase; (iv) an oil outlet connected to the fluid separator; (v) a gas outlet connected to the fluid separator; and (vi) a water outlet connected to the fluid separator; (c) a solids cleaning system connected to the solids outlet, wherein the solids cleaning system is configured to clean deposits of residual oil from the solid particles separated by the solids separator to provide cleaned solid particles and first residual oil, the solids cleaning system having a first output for outputting the cleaned solid particles and a second output configured to (Continued)

output the first residual oil; and (d) a water cleaning and recycling system connected to the water outlet, wherein the water cleaning and recycling system is configured to clean residual oil from the water phase separated by the fluid separator, the water cleaning and recycling system comprising an oil filter for separating the residual oil from the water phase to provide cleaned water and second residual oil, the oil filter having a third output for recycling the cleaned water to at least one well head of the oil field, wherein the third output comprises a second pipe network configured to be connectable to the at least one well head of the oil field, and a fourth output configured to output the second residual oil. Also disclosed is a corresponding method.

25 Claims, 4 Drawing Sheets

(51) Int. Cl.
| | |
|---|---|
| B01D 17/12 | (2006.01) |
| B01D 21/30 | (2006.01) |
| B01D 21/32 | (2006.01) |
| B01D 21/34 | (2006.01) |
| C02F 1/00 | (2023.01) |
| C02F 1/40 | (2023.01) |
| E21B 43/34 | (2006.01) |
| C02F 101/32 | (2006.01) |
| C02F 103/10 | (2006.01) |

(52) U.S. Cl.
CPC ........... *B01D 21/302* (2013.01); *B01D 21/32* (2013.01); *B01D 21/34* (2013.01); *C02F 1/008* (2013.01); *C02F 1/40* (2013.01); *E21B 43/35* (2020.05); *C02F 2001/007* (2013.01); *C02F 2101/32* (2013.01); *C02F 2103/10* (2013.01); *C02F 2209/005* (2013.01); *C02F 2209/02* (2013.01); *C02F 2209/03* (2013.01); *C02F 2209/40* (2013.01); *C02F 2209/44* (2013.01)

(56) References Cited

U.S. PATENT DOCUMENTS

| | | | | |
|---|---|---|---|---|
| 2001/0027950 | A1* | 10/2001 | Rabie | B01D 63/031 210/636 |
| 2012/0285896 | A1* | 11/2012 | Black | B01D 17/047 210/741 |
| 2015/0111799 | A1* | 4/2015 | Miranda Olvera | C09K 8/035 585/4 |
| 2018/0108095 | A1 | 4/2018 | Venkatasubbarao et al. | |

OTHER PUBLICATIONS

International Preliminary Report on Patentability in related international application No. PCT/EP2020/052504 issued on Jul. 28, 2022.

\* cited by examiner

TREATMENT OF MULTIPHASE HYDROCARBON-CONTAINING FLUID IN OIL AND/OR GAS PRODUCTION

FIELD OF THE INVENTION

The present invention relates to an apparatus for, and a method of, treating a multiphase hydrocarbon-containing fluid in an oil and/or gas production facility. In particular, the present invention relates to an apparatus and method in which oil, water, gas and solid particles, typically sand, from a hydrocarbon-containing fluid produced from an oil and/or gas production facility are separated into the four constituent phases.

BACKGROUND

Generally the production from an oil well or group of oil wells will comprise oil, gas, water and solid particles (usually sand). In the industry these are often referred to as different phases, that is, there are four phases in the production flow. Before oil and/or gas can be exported from a production facility to a refinery or storage facility, it must be first cleaned of any solids and water. It is also beneficial to separate the gas from the oil so that there are two independent product streams, that is, gas and oil. Water and solid particles are considered to be by-products that need to be disposed of Usually the solids need to be cleaned of any traces of oil so that they can be disposed of without damage to the environment. Therefore the production flow is best separated into its four phases. Today this often requires a lot of equipment to carry out these separations in sequential steps. In particular, solids are removed first using one processing step followed by water removal and finally gas and oil. As a result, a large footprint or platform area is required which increases the overall cost of the system. This can significantly increase the construction cost of the production facility.

Onshore oil fields are located in many countries around the world. As discussed above, oil wells often produce, as well as the desired oil, and typically also gas, undesired solid particles, usually in the form of sand. The sand usually requires disposal as a waste by-product of oil production. However, the sand from the oil well is contaminated with oil, for example, and so requires treatment prior to disposal. In various countries there are practical limitations, and also government regulations associated with environmental concerns and policies, that prevent the production of solids/sand from increasing above a certain threshold. As a result, many oil field operators periodically monitor the content of the sand and other phases, e.g. oil & water, of the production hydrocarbon-containing fluid. This monitoring can provide an indication of the volume of sand to be treated for disposal. For example, the monitoring of the content hydrocarbon-containing fluid may be carried out once per month.

Such monitoring is most effectively carried out by multiphase flow meters (MFM) which are installed in-line on a production line from an oil well. However, multiphase flow meters are expensive to acquire and install, so it is generally not viable to install a respective multiphase flow meter on each well in an oil field.

Furthermore, such multiphase flow meters currently in commercial use in oil filed installations can only measure the flow of fluid phases, i.e. liquid and gas phases, and cannot measure the flow of a solid phase, for example a sand phase. The sand phase must be separated from the fluid phases and analysed, typically remotely in a laboratory. For example, a sample of the product output along the production line is taken; the sand is separated from the fluid phases; and then the amount (e.g. weight) of sand is measured to determine the flow rate of sand from the respective oil well at that particular point in time.

Therefore, the monitoring exercise requires moving a multiphase flow meter from well to well, recording the phase data for some period of time, and possibly at different production rates, to understand which well(s) are producing the most solids and then possibly choking back particular well(s) to prevent excess sand production. Off-line analysis of the flow rate of the solids must be carried out separately. This can be a very manual and time-consuming process.

Furthermore, after the solids have been removed from the oil fraction of the oil well production, the solid particles still have a lot of hydrocarbons stuck to them. The solids are therefore contaminated and require a cleaning treatment. The solids are consequently expensive to dispose of, and usually require to be transported to a dedicated solids clean-up facility at a different location, remote from the oil field and the oil/gas production facility, for treatment. Also, since the transportation may be periodic, and sometimes irregular, large volumes of contaminated solids may have to be collected and stockpiled on-site at the oil/gas production facility, causing potential environmental problems.

As a general rule, older oil fields tend to produce more solids in the form of sand. Many of these older fields also suffer from the problem that the reservoir pressure is reduced. Therefore, water is often injected into dedicated injection wells to increase the pressure and 'sweep' the oil towards the production wells, in a process generally known as enhanced oil recovery. The injected water is required by local environmental regulations to surpass a minimum quality threshold, e.g., the solid content must be less than a particular ppm maximum threshold. Therefore, when an oil field requires the application of the enhanced oil recovery process to increase the oil production rate, clean water is often trucked in at significant cost. In many oil-producing countries, clean water is expensive, and may have been produced by desalination plants.

SUMMARY OF THE INVENTION

The present invention aims at least partially to overcome these problems in known oil and/or gas production technology.

In particular, the present invention aims to provide an apparatus for, and a method of, treating a multiphase hydrocarbon-containing fluid in an oil and/or gas production facility which can more easily and efficiently process multiple oil, water, gas and solid phases of a multiphase hydrocarbon-containing fluid, and preferably also with lower capital and production costs than known oil and/or gas production technology.

In a first aspect, the present invention provides an apparatus for treating a multiphase hydrocarbon-containing fluid in an oil and/or gas production facility, the apparatus comprising:

(a) an inlet for a multiphase hydrocarbon-containing fluid comprising oil, water, gas and solid particles to be separated into its constituent oil, water, gas and solid phases, wherein the inlet comprises a first pipe network configured to be connectable to a plurality of oil well heads in an oil field;

(b) a separation system comprising:
(i) a solids separator in fluid communication with the inlet, the solids separator being configured to separate solid particles from the multiphase hydrocarbon-containing fluid to provide separated solid particles and a remaining multiphase hydrocarbon-containing fluid;

(ii) a solids outlet connected to the solids separator such that the solid particles separated by the solids separator from the multiphase hydrocarbon-containing fluid can be removed from the separation system through the solids outlet;

(iii) a fluid separator in fluid communication with the solids separator and arranged to receive the remaining multiphase hydrocarbon-containing fluid, the fluid separator being configured to separate the remaining multiphase hydrocarbon-containing fluid into an oil phase, a water phase and a gas phase;

(iv) an oil outlet connected to the fluid separator such that the oil phase can be removed from the separation system through the oil outlet;

(v) a gas outlet connected to the fluid separator such that the gas phase can be removed from the separation system through the gas outlet; and (vi) a water outlet connected to the fluid separator such that the water phase can be removed from the separation system through the water outlet;

(c) a solids cleaning system connected to the solids outlet, wherein the solids cleaning system is configured to clean deposits of residual oil from the solid particles separated by the solids separator to provide cleaned solid particles and first residual oil, the solids cleaning system having a first output for outputting the cleaned solid particles and a second output configured to output the first residual oil; and (d) a water cleaning and recycling system connected to the water outlet, wherein the water cleaning and recycling system is configured to clean residual oil from the water phase separated by the fluid separator, the water cleaning and recycling system comprising an oil separator for separating the residual oil from the water phase to provide cleaned water and second residual oil, the oil separator having a third output for recycling the cleaned water to at least one well head of the oil field, wherein the third output comprises a second pipe network configured to be connectable to the at least one well head of the oil field, and a fourth output configured to output the second residual oil.

In a preferred embodiment of the present invention, the second output of the solids cleaning system is configured to recycle the first residual oil to the separation system, and/or the fourth output of the water cleaning and recycling system is configured to recycle the second residual oil to the separation system. Typically, the second output is configured to recycle the first residual oil to the fluid separator and/or the fourth output is configured to recycle the second residual oil to the fluid separator.

In a preferred embodiment of the present invention, the water cleaning and recycling system further comprises a pump, wherein the pump is arranged to supply the water phase to an output end of the second pipe network, the output end being connectable to the at least one well head, at a water pressure within a pressure range of from 100 to 5000 psi.

The pump may be located between the water outlet and the oil separator. Alternatively, the pump may be located between the oil separator and the output end of the second pipe network.

Typically, the oil separator is an oil filter, but may alternatively comprise a centrifugal separator.

In one embodiment, a buffer tank is located between the oil separator and the output end of the second pipe network. The buffer tank is arranged to store a supply of cleaned water, and a water discharge controller is provided to control the discharge of cleaned water from the buffer tank to the at least one well head. The supply may be based on a demand signal, for example from a sensor located at the at least one well head.

In a preferred embodiment of the present invention, the first pipe network comprises a primary pipe system comprising a plurality of upstream pipelines, each upstream pipeline being connectable to a respective oil well head, a primary manifold connected to the plurality of upstream pipelines, and a common downstream pipeline connected to the primary manifold, the common downstream pipeline connecting the plurality of upstream pipelines to the inlet, each upstream pipeline comprising a respective first control mechanism to control the flow of the multiphase hydrocarbon-containing fluid along the respective upstream pipeline. Typically, each first control mechanism comprises an upstream choke manifold for controlling the pressure of the multiphase hydrocarbon-containing fluid from the respective well head, and a downstream valve for closing or opening the respective upstream pipeline.

In a preferred embodiment of the present invention, the first pipe network further comprises a secondary pipe system comprising a plurality of upstream supply lines, each upstream supply line being connected to a respective upstream pipeline, a secondary manifold connected to the plurality of upstream supply lines, and a common downstream supply line connected to the secondary manifold, the common downstream supply line connecting the plurality of upstream supply lines to the solids separator, each upstream supply line comprising a respective second control mechanism to divert at least a portion of the flow of the multiphase hydrocarbon-containing fluid from the respective upstream pipeline into the respective upstream supply line, and further comprising a multiphase flow meter located along the common downstream supply line for measuring the flow of at least two of the phases of the multiphase hydrocarbon-containing fluid.

Typically, the common downstream supply line is connected to the inlet of the solids separator. Alternatively, the common downstream supply line may be connected to a secondary inlet of the solids separator.

In one embodiment of the present invention, the solids separator and the fluid separator are physically separate units connected by a pipeline between a fluid outlet of the solids separator and a fluid inlet of the fluid separator. The fluid separator typically comprises: a separation tank, the separation tank comprising the fluid inlet at an upstream side of the separation tank; a first reservoir for containing an oil/water liquid mixture, from the remaining multiphase hydrocarbon-containing fluid, which has been separated from the solid particles separated by the solids separator; an upper part of the separation tank being located above the first reservoir for receiving gas separated from the oil/water liquid mixture; a second reservoir for containing oil separated from the oil/water liquid mixture, the second reservoir being located downstream of the first reservoir; a weir at an end of the first reservoir that divides the first reservoir from the second reservoir, the weir being provided to separate oil from the oil/water liquid mixture; a first liquid outlet of the first reservoir connected to a lower part of the separation tank, wherein the first liquid outlet comprises the water outlet; a second liquid outlet of the second reservoir connected to the lower part of the separation tank, wherein the second liquid outlet comprises the oil outlet; and the gas outlet connected to the upper part of the separation tank.

In another embodiment of the present invention, the solids separator and the fluid separator are physically integrated into a common separation unit. Typically, the common separation unit comprises: a separation tank, the separation tank comprising the inlet at an upstream side of the separation tank; the solids separator in fluid communication with the inlet; the solids outlet connected to the separation tank such that solid particles separated by the solids separator from the multiphase hydrocarbon-containing fluid can be removed from the separation tank through said solids outlet; a first reservoir for containing an oil/water liquid mixture, from the remaining multiphase hydrocarbon-containing fluid, which has been separated from the solid particles separated by the solids separator; an upper part of the separation tank being located above the first reservoir for receiving gas separated from the oil/water liquid mixture; a second reservoir for containing oil separated from the oil/water liquid mixture, the second reservoir being located downstream of the first reservoir; a weir at an end of the first reservoir that divides the first reservoir from the second reservoir, the weir being provided to separate oil from the oil/water liquid mixture; a first liquid outlet of the first reservoir connected to a lower part of the separation tank wherein the first liquid outlet comprises the water outlet; a second liquid outlet of the second reservoir connected to the lower part of the separation tank, wherein the second liquid outlet comprises the oil outlet; and the gas outlet connected to the upper part of the separation tank.

In the preferred embodiments of the present invention, the apparatus is adapted continuously to separate oil, water, gas and solid particles from a continuous flow of a hydrocarbon-containing fluid produced from an oil and/or gas production facility and simultaneously to provide a continuous flow of the cleaned water to the cleaned water to the at least one well head of the oil field.

In the preferred embodiments of the present invention, the oil separator is configured to separate oil from the water phase whereby the oil content of the cleaned water is lower than 20 ppm by weight, optionally within the range of from 5 to 20 ppm by weight, based on the total weight of the cleaned water.

In the preferred embodiments of the present invention, the fluid separator is configured to remove oil from the water phase whereby the oil content of the water phase exiting the water outlet is lower than 500 ppm by weight, optionally within the range of from 300 to 500 ppm by weight, based on the total weight of the water phase.

In the preferred embodiments of the present invention, the solids separator is configured to remove solid particles from the multiphase hydrocarbon-containing fluid whereby the solid particle content of the remaining multiphase hydrocarbon-containing fluid entering the fluid separator is lower than 1 weight %, optionally within the range of from 0.5 to 1 weight %, based on the total weight of the remaining multiphase hydrocarbon-containing fluid.

In the preferred embodiments of the present invention, the fluid separator is configured to remove water from the oil phase whereby the water content of the oil phase exiting the oil outlet is lower than 2 weight %, optionally within the range of from 1 to 2 weight %, based on the total weight of the oil phase.

In the preferred embodiments of the present invention, the solids separator is configured to separate solid particles from the multiphase hydrocarbon-containing fluid whereby the hydrocarbon content of the separated solid particles exiting the solids outlet is lower than 10 weight %, optionally within the range of from 5 to 10 weight %, based on the total weight of the separated solid particles.

In the preferred embodiments of the present invention, wherein the solids cleaning system is configured to remove hydrocarbons from the separated solid particles to provide cleaned solid particles, whereby the hydrocarbon content of the cleaned solid particles exiting the first output is lower than 1 weight %, based on the total weight of the cleaned solid particles.

In preferred embodiments of the present invention, the apparatus further comprises a control and monitoring system, a first control system for operating the first control mechanism, and a second control system for operating the second control mechanism, and wherein the multiphase flow meter comprises a sensor system arranged to supply phase data to the control and monitoring system, the phase data having been generated by measuring the flow of the at least two phases of the multiphase hydrocarbon-containing fluid, wherein the control and monitoring system is adapted to operate the first control system based on the phase data supplied to the control and monitoring system from the sensor system.

Preferably, the control and monitoring system is adapted to control the first control system, in response to the phase data, by closing one of the upstream pipelines, by operating the respective first control mechanism, wherein the phase data is for the portion of the multiphase hydrocarbon-containing fluid which has passed through the respective upstream pipeline which is closed.

Typically, wherein the control and monitoring system is adapted to operate the second control system based on a preset program, which preset program includes at least one or both of a preset sequence or a preset time schedule, so that the plurality of upstream supply lines are individually opened to provide a respective diverted flow through the multiphase flow meter. Preferably, the preset program includes at least one or both of a preset sequence or a preset time schedule.

In preferred embodiments of the present invention, the control and monitoring system is adapted to operate the second control system to provide the diverted flow through the multiphase flow meter from a respective upstream pipeline while simultaneously permitting flow of the multiphase hydrocarbon-containing fluid through at least one of the other upstream pipelines to flow to the outlet.

In preferred embodiments of the present invention, the control and monitoring system is adapted to operate the second control system to provide the diverted flow through the multiphase flow meter from a respective upstream pipeline, to enable real-time monitoring of the composition of the multiphase hydrocarbon-containing fluid diverted into the common downstream supply line, while simultaneously causing a continuous flow of the multiphase hydrocarbon-containing fluid through at least one of the other upstream pipelines to the outlet.

In preferred embodiments of the present invention, the apparatus further comprises a respective sensor system on each upstream pipeline, wherein each sensor system is adapted to measure at least one or both of pressure and temperature of the multiphase hydrocarbon-containing fluid at the respective oil well head, and wherein the sensor systems are coupled to the control and monitoring system, and the control and monitoring system is adapted to operate the first and/or second control systems based on input data from the sensor systems.

In preferred embodiments of the present invention, the apparatus is adapted continuously to monitor in real-time a first continuous flow of a multiphase hydrocarbon-containing fluid, wherein the first continuous flow which is monitored is the output of a single oil well head in an oil field comprising a plurality of oil well heads, and simultaneously, while the output of the said single oil well head is being monitored, to provide a second continuous flow of the multiphase hydrocarbon-containing fluid to the output, wherein the second continuous flow comprises a co-mingled flow from plural oils well heads in the oil field other than the said single oil well head that is being monitored.

The present invention further provides an oil and/or gas production facility incorporating the apparatus of the first aspect of the present invention, wherein the first pipe network is connected to a plurality of oil well heads in an oil field and the second pipe network is connected to at least one well head of the oil field.

In a second aspect, the present invention provides a method of continuously treating a multiphase hydrocarbon-containing fluid in an oil and/or gas production facility, the method comprising the steps of:

(a) extracting a multiphase hydrocarbon-containing fluid simultaneously from a plurality of oil well heads in an oil field, the multiphase hydrocarbon-containing fluid comprising oil, water, gas and solid particles to be separated into its constituent oil, water, gas and solid phases;

(b) separating solid particles from the multiphase hydrocarbon-containing fluid using a solids separator and independently outputting from the solids separator solid particles and a remaining multiphase hydrocarbon-containing fluid;

(c) separating the remaining multiphase hydrocarbon-containing fluid into an oil phase, a water phase and a gas phase in a fluid separator in fluid communication with the solids separator;

(d) independently removing the oil phase, the gas phase and the water phase from the fluid separator, wherein the oil phase is removed from the separation system through an oil outlet, the gas phase is removed from the separation system through a gas outlet; and the water phase is removed from the separation system through a water outlet;

(e) cleaning residual oil deposits from the solid particles separated by the solids separator in a solids cleaning system connected to a solids output of the solids separator, the solids cleaning system having a first output outputting the cleaned solid particles and a second output outputting first residual oil; and (f) cleaning residual oil from the water phase separated by the fluid separator by a water cleaning and recycling system connected to the water outlet of the fluid separator, wherein the water cleaning and recycling system comprises an oil separator separating oil from the water phase to provide cleaned water and second residual oil, the oil separator outputting the cleaned water to at least one well head of the oil field, and outputting the second residual oil.

In the preferred embodiments of the present invention, the first residual oil is recycled to the separation system and/or the second residual oil is recycled to the separation system. Typically, the first residual oil is recycled to the fluid separator and/or the second residual oil is recycled to the fluid separator.

Preferably, the method of the present invention continuously separates oil, water, gas and solid particles from a continuous flow of a hydrocarbon-containing fluid produced from an oil and/or gas production facility and continuously recycles cleaned water to the at least one well head.

Further preferred features of the method are also defined in the dependent claims.

The preferred embodiments of the present invention accordingly provide an apparatus and method for separating oil, water, gas and solid particles from a hydrocarbon-containing fluid produced from an oil and/or gas production facility using a compact unit where all four phases are separated, and which can more easily and efficiently process multiple oil, water, gas and solid phases of a multiphase hydrocarbon-containing fluid, and preferably also with lower capital and production costs than known oil and/or gas production technology.

BRIEF DESCRIPTION OF THE DRAWINGS

Embodiments of the present invention will now be described in more detail by way of example only with reference to the accompanying drawings, in which.

DETAILED DESCRIPTION

Figure 1:
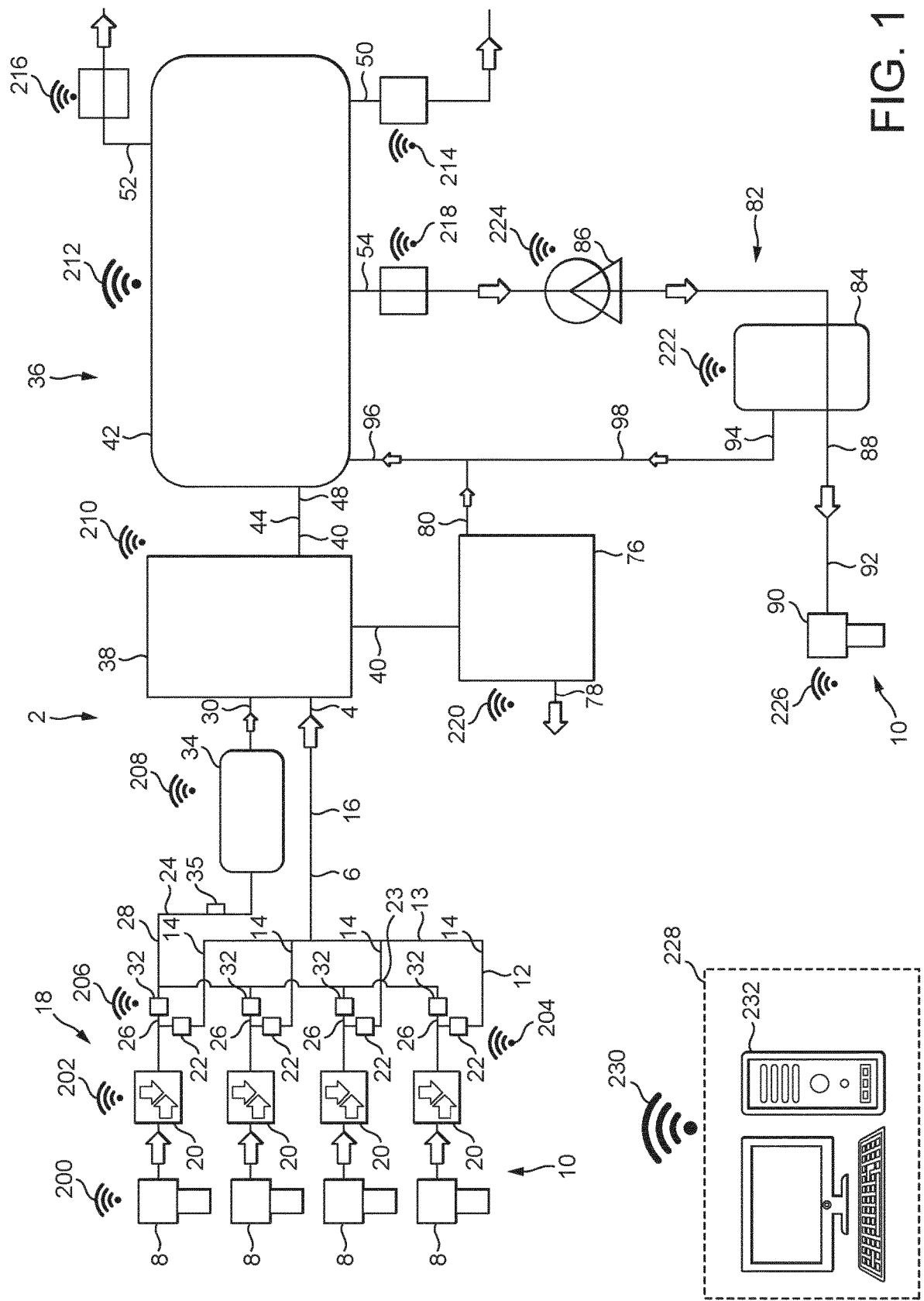
FIG. 1 schematically illustrates a plan view of an apparatus for treating a multiphase hydrocarbon-containing fluid in an oil and/or gas production facility in accordance with an embodiment of the present invention.

Referring to FIG. 1 there is shown a schematic illustration of an apparatus, designated generally as 2, for treating a multiphase hydrocarbon-containing fluid in an oil and/or gas production facility. In particular, the apparatus 2, in use, separates oil, water, gas and solid particles from a hydrocarbon-containing fluid extracted from a plurality of oil well heads in an oil field of an oil and/or gas production facility and produces cleaned water.

The cleaned water may be recycled back to a well head of the oil and/or gas production facility in accordance with an embodiment of the present invention. Alternatively, the cleaned water may be environmentally disposed of, for example by being deposited in the sea or collected in a fixed tank or mobile tanker and then disposed of.

The separated oil and gas phases can be stored for subsequent processing into useful hydrocarbon products. Alternatively, the separated oil and gas phases may be transported by a pipeline to a remote facility, for example an oil refinery.

The solid particles are cleaned and can be deposited locally relative to the oil and/or gas production facility in accordance with local environmental regulations by ensuring that the cleaned solid particles, e.g. sand, are cleaned to a measured value of oil/hydrocarbon contamination which is below a preset threshold set in accordance with the local environmental regulations to achieve environmentally safe disposal.

The apparatus 2 comprises an inlet 4 for a multiphase hydrocarbon-containing fluid comprising oil, water, gas and solid particles to be separated into its constituent oil, water, gas and solid phases. The inlet 4 is connected to a first pipe network 6 configured to be connectable to a plurality of oil well heads 8 in an oil field 10.

In the illustrated embodiment, production from a multi-well oil field 10 is carried out, and the production is co-mingled through a common phase separation system, as described hereinafter. In the illustrated embodiment, four oil wells 8 are shown in the oil field 10, but there may be more or fewer oil wells 8 connected to the common separation system.

The first pipe network 6 comprises a primary pipe system 12 comprising a plurality of upstream pipelines 14. Each upstream pipeline 14 is, in use, connected to a respective oil well 8. A common downstream pipeline 16 connects the plurality of upstream pipelines 14 to the inlet 4. A primary manifold 13 is connected to the plurality of upstream pipelines 14, and the common downstream pipeline 16 is connected to the primary manifold 13. Each upstream pipeline 14 comprises a respective first control mechanism 18 to control the flow of the multiphase hydrocarbon-containing fluid along the respective upstream pipeline 14. Typically, each first control mechanism 18 comprises an upstream choke manifold 20 for controlling the pressure of the multiphase hydrocarbon-containing fluid from the respective well head 8, and a downstream valve 22 for closing or opening the respective upstream pipeline 14.

The first pipe network 6 further comprises a secondary pipe system 24 comprising a plurality of upstream supply lines 26. Each upstream supply line 26 is connected to a respective upstream pipeline 14. A common downstream supply line 28 connects the plurality of upstream supply lines 26 to a secondary inlet 30, as illustrated in FIG. 1. A secondary manifold 23 is connected to the plurality of upstream supply lines 26, and the common downstream supply line 28 is connected to the secondary manifold 23. Alternatively, the common downstream supply line 28 may connect the plurality of upstream supply lines 26 to the inlet 4.

Each upstream supply line 26 comprises a respective second control mechanism 32, comprising a valve 32, to divert, when desired, at least a portion of the flow of the multiphase hydrocarbon-containing fluid from the respective upstream pipeline 14 into the respective upstream supply line 26. A multiphase flow meter 34 is located along the common downstream supply line 28 for measuring the flow of at least two of the phases of the multiphase hydrocarbon-containing fluid, and thereby to generate phase data. For example, the multiphase flow meter 34 can be configured to measure the flow of liquid phases, e.g an oil phase and an aqueous phase, and a gas phase. In addition to the multiphase flow meter 34, a conventional additional auxiliary sand sensor 35 can be permanently provided on the common downstream supply line 28, or temporarily, and typically serially and sequentially, provided on the individual upstream pipelines 14. The auxiliary sand sensor 35 can be used to measure the flow rate of sand from the respective oil well(s) at any particular point in time.

The apparatus further comprises a separation system 36 which separates oil, water, gas and solid particles from the hydrocarbon-containing fluid.

The separation system 36 comprises a solids separator 38 in fluid communication with the inlet 4 and the secondary inlet 30. The solids separator 38 is configured to separate solid particles from the multiphase hydrocarbon-containing fluid to provide separated solid particles and a remaining multiphase hydrocarbon-containing fluid.

Typically the solids separator 38 comprises a hydrocyclone which centrifugally separates solid particles from a remaining multiphase hydrocarbon-containing fluid comprising liquid phases, i.e. oil and water phases, and a gas phase, e.g. a methane phase. The separated solid particles are collected below the hydrocyclone in a collector into which the solid particles fall under the action of gravity. The solid particles are then outputted from the collector, either continuously or periodically in a series of batches. A weighing system can be provided to weigh the collected solid particles so that after a particular weight threshold has been achieved, the solid particles are outputted as a batch for subsequent treatment as described further below. The weight of the solids collected over a defined period of time can also provide the weight of solids production per unit time, which in turn can provide the weight of solids produced per unit volume of produced fluids when combined with the cumulative volume of produced fluids over the same period of time. This can be used as a control parameter within the system. The solid particles may be outputted as a flow of solid particles, but preferably are fluidised by water to provide a fluidised flow from the collector to the subsequent treatment. A suitable solids separator 38 is disclosed in WO-A-2016/075317. Other solids separators for separating solid particles, such as sand, from multiphase hydrocarbon-containing fluids in the oil and gas production industry are known to those skilled in the art of oil and gas production.

A solids outlet 40 is connected to the solids separator 38 such that the solid particles separated by the solids separator from the multiphase hydrocarbon-containing fluid can be removed from the separation system 36 through the solids outlet 40.

The separation system 36 further comprises a fluid separator 42. The fluid separator 42 is in fluid communication with the solids separator 38 and arranged to receive the remaining multiphase hydrocarbon-containing fluid. The fluid separator 42 is configured to separate the remaining multiphase hydrocarbon-containing fluid into an oil phase, a water phase and a gas phase.

In the illustrated embodiment of the present invention, the solids separator 38 and the fluid separator 42 are physically separate units connected by a pipeline 44 between a fluid outlet 46 of the solids separator 38 and a fluid inlet 48 of the fluid separator 42.

An oil outlet 50 is connected to the fluid separator 42 such that the oil phase can be removed from the separation system 36 through the oil outlet 50. A gas outlet 52 is connected to the fluid separator 42 such that the gas phase can be removed from the separation system 36 through the gas outlet 52. A water outlet 54 is connected to the fluid separator 42 such that the water phase can be removed from the separation system 36 through the water outlet 54.

Figure 2:
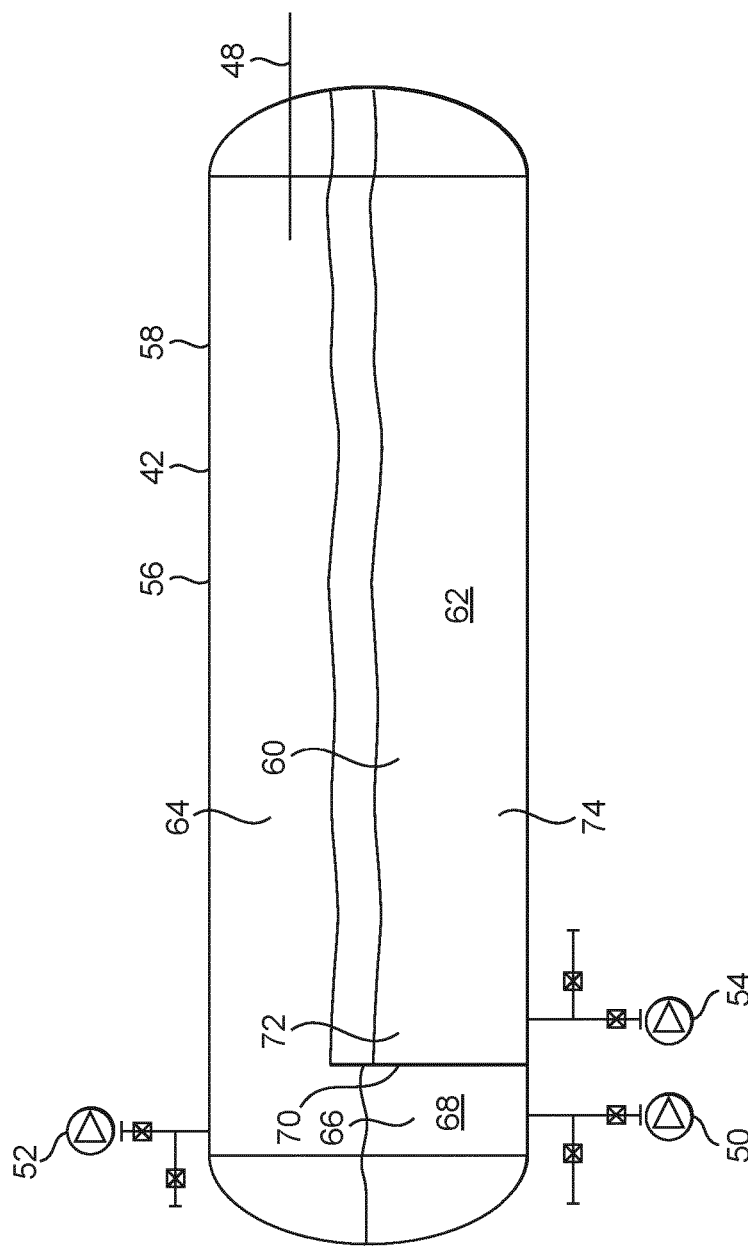
FIG. 2 schematically illustrates in enlarged detail the fluid separator in the apparatus of FIG. 1.

Referring to FIG. 2, in one preferred embodiment the fluid separator 42 typically comprises a separation tank 56. The separation tank 56 comprises the fluid inlet 48 at an upstream side 58 of the separation tank 56. A first reservoir 60 in use contains an oil/water liquid mixture 62, from the remaining multiphase hydrocarbon-containing fluid, which has been separated from the solid particles separated by the solids separator 38. An upper part 64 of the separation tank 56 is located above the first reservoir 60 and in use receives gas separated from the oil/water liquid mixture 62. A second reservoir 66 in use contains oil 68 separated from the oil/water liquid mixture 62. The second reservoir 66 is located downstream of the first reservoir 60. A weir 70 is located at an end 72 of the first reservoir 60 that divides the first reservoir 60 from the second reservoir 66. The weir 70 is provided to separate oil 68 from the oil/water liquid mixture 62.

The water outlet 54 is a liquid outlet of the first reservoir 60, and is connected to a lower part 74 of the separation tank 56, and thereby a lower part of the first reservoir 60. The oil outlet 50 is a liquid outlet of the second reservoir 66, and is connected to the lower part 74 of the separation tank 56, and thereby a lower part of the second reservoir 66. The gas outlet 52 is connected to the upper part 64 of the separation tank 56.

A suitable separation tank 56 is disclosed in WO-A-2017/137272. However, other apparatus known for use in the oil and gas production industry to separate oil, water and gas phases can be used in the present invention.

Figure 3:
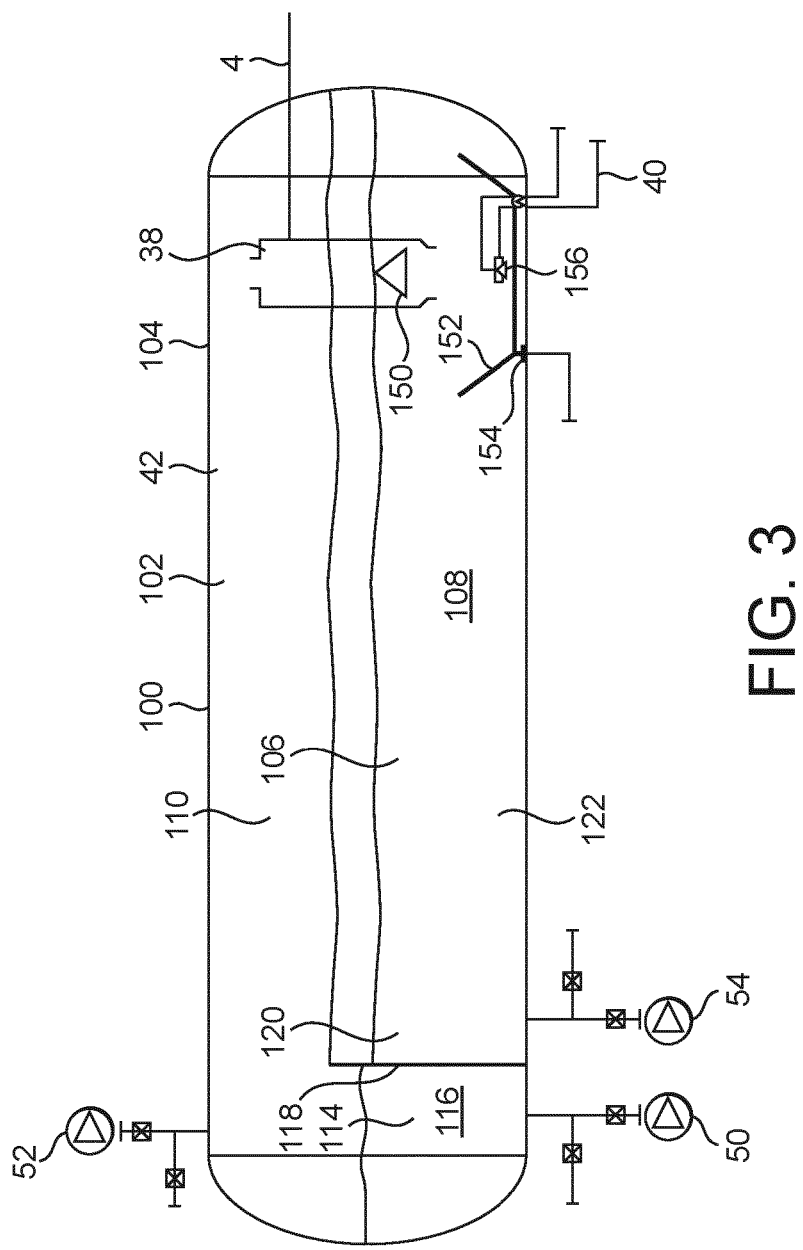
FIG. 3 schematically illustrates in enlarged detail an alternative arrangement of the solids separator and the fluid separator in the apparatus of FIG. 1.

In another embodiment of the present invention, which is illustrated in FIG. 3, the solids separator 38 and the fluid separator 42 are physically integrated into a common separation unit. Typically, the common separation unit 100 comprises a separation tank 102 which comprises the inlet 4 at an upstream side 104 of the separation tank 102. The solids separator 38 is in fluid communication with the inlet 4 and the secondary inlet 30. The solids outlet 40 is connected to the separation tank 102 such that solid particles separated by the solids separator 38 from the multiphase hydrocarbon-containing fluid can be removed from the separation tank 102 through the solids outlet 40. As described above for the first embodiment, the solids separator 38 typically comprises a hydrocyclone 150. The separated solid particles may be collected below the hydrocyclone in a collector 152 into which the solid particles fall under the action of gravity. The solid particles are then outputted from the collector 152, either continuously or periodically in a series of batches. A weighing system 154 can be provided to weigh the collected solid particles so that after a particular weight threshold has been achieved, the solid particles are outputted as a batch for subsequent treatment as described further below. The solid particles may be outputted as a flow of solid particles, but preferably are fluidised by water using a fluidising system 156 to provide a fluidised flow from the collector 154 to the subsequent treatment.

In the separation tank 102, a first reservoir 106 in use contains an oil/water liquid mixture 108, from the remaining multiphase hydrocarbon-containing fluid, which has been separated from the solid particles separated by the solids separator 38. An upper part 110 of the separation tank 102 is located above the first reservoir 106 for receiving gas separated from the oil/water liquid mixture 108. A second reservoir 114 in use contains oil 116 separated from the oil/water liquid mixture 108. The second reservoir 114 is located downstream of the first reservoir 106. A weir 118 at an end 120 of the first reservoir 106 divides the first reservoir 106 from the second reservoir 114, the weir 118 being provided to separate oil 116 from the oil/water liquid mixture 108. The water outlet 54 is a liquid outlet of the first reservoir 106, and is connected to a lower part 122 of the separation tank 102, and thereby a lower part of the first reservoir 106. The oil outlet 50 is a liquid outlet of the second reservoir 114, and is connected to the lower part 122 of the separation tank 102, and thereby a lower part of the second reservoir 114. The gas outlet 52 is connected to the upper part 110 of the separation tank 102.

Again, a suitable separation tank 102 is disclosed in WO-A-2017/137272. However, other apparatus known for use in the oil and gas production industry to separate sand, oil, water and gas phases can be used in the present invention.

In either of the illustrated embodiments, the solids separator 38 is preferably configured to remove solid particles from the multiphase hydrocarbon-containing fluid whereby the solid particle content of the remaining multiphase hydrocarbon-containing fluid, which enters the fluid separator 42, is lower than 1 weight %, optionally within the range of from 0/.5 to 1 weight %, based on the total weight of the remaining multiphase hydrocarbon-containing fluid. Furthermore, preferably the solids separator 38 is configured to separate solid particles from the multiphase hydrocarbon-containing fluid whereby the hydrocarbon content of the separated solid particles exiting the solids outlet is lower than 10 weight %, optionally within the range of from 5 to 10 weight %, based on the total weight of the separated solid particles. Yet further, preferably the fluid separator 42 is configured to remove water from the oil phase whereby the water content of the oil phase exiting the oil outlet 50 is lower than 2 weight %, optionally within the range of from 1 to 2 weight %, based on the total weight of the oil phase.

Referring back to FIG. 1, a solids cleaning system 76 is connected to the solids outlet 40. The solids cleaning system 76 is configured to clean deposits of residual oil from the solid particles separated by the solids separator 38 to provide cleaned solid particles and first residual oil. The solids cleaning system 76 has a first output 78 for outputting the cleaned solid particles and a second output 80 configured to output the first residual oil. In a preferred embodiment of the present invention, the second output 80 of the solids cleaning system 76 is configured to recycle the first residual oil to the separation system 36, and more preferably to the fluid separator 42, via a return pipeline 96.

Accordingly, residual oil recovered from the solid particles such as sand can be recycled into the main oil flow through the apparatus 2. In the preferred embodiments of the present invention, the solids cleaning system is configured to remove hydrocarbons from the separated solid particles to provide cleaned solid particles, whereby the hydrocarbon content of the cleaned solid particles exiting the first output is lower than 1 weight %, based on the total weight of the cleaned solid particles.

Such cleaned solid particles, such as sand, are sufficiently free of residual hydrocarbons that in most, if not all, oil producing countries it is legally and environmentally acceptable to dispose of the cleaned sand locally in the vicinity of the oil and/or gas production facility.

In addition to the solids cleaning system 76, a water cleaning and recycling system 82 is connected to the water outlet 54. The water cleaning and recycling system 82 is configured to clean residual oil from the water phase separated by the fluid separator 42. The water cleaning and recycling system 82 comprises an oil separator 84 for separating the residual oil from the water phase to provide cleaned water and second residual oil. The oil separator 84 may be any separator system known for use to separate oil from an aqueous liquid in the oil and gas production industry. For example, the oil separator 84 may be a filter, typically a micro-filter or a nano-filter, or a centrifugal separation system.

In the illustrated embodiment, a pump 86 is provided in the water cleaning and recycling system 82 between the water outlet 54 and the oil separator 84, i.e. upstream of the oil separator 84. Alternatively, the pump 86 may be located downstream of the oil separator 84. The pump 86 is arranged to supply the water phase to a water output 88 of the water cleaning and recycling system 82, the water output 88 being connectable to the at least one well head 90, at a water pressure within a pressure range of from 100 to 5000 psi. When the pump 86 is located upstream of an oil separator which is an oil filter 84, efficient oil filtering may be achieved at high volume flow rates.

The oil separator 84 has the water output 88 downstream thereof for recycling the cleaned water to at least one well head 90, i.e. a water injection well 90, of the oil field 10. The water output 88 comprises a second pipe network 92 configured to be connectable to the at least one well head 90 of the oil field 10 at a water pressure sufficiently high to be suitable for achieving enhanced oil recovery (EOR) in the oil field 10.

The oil separator 84 also has an oil output 94 configured to output the residual oil. In a preferred embodiment of the present invention, the oil output 94 of the water cleaning and recycling system 82 is configured to recycle the residual oil to the separation system 36, and more preferably to the fluid separator 42, via a second return pipeline 98 connected to the return pipeline 96.

Figure 4:
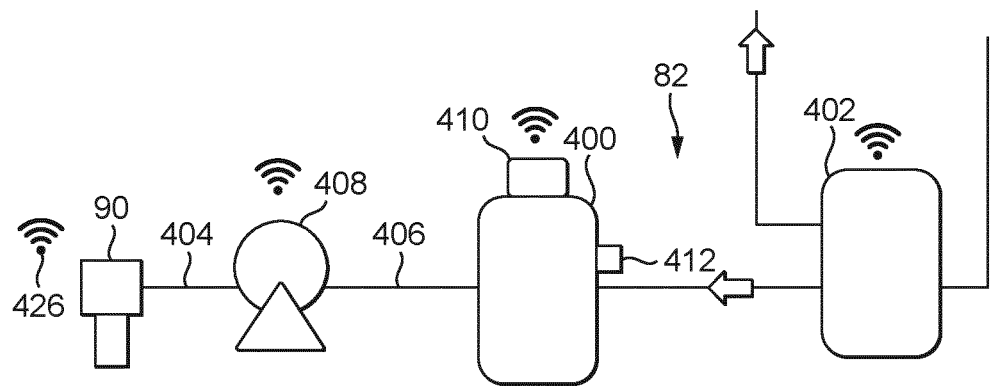
FIG. 4 schematically illustrates a plan view of part of an apparatus for treating a multiphase hydrocarbon-containing fluid in an oil and/or gas production facility in accordance with another embodiment of the present invention.

In an alternative embodiment shown in FIG. 4, which shows only a part of the water cleaning and recycling system 82 and shows a modification as compared to the embodiment of FIG. 1, a buffer tank 400 is located between the oil separator 402 and the output end 404 of the second pipe network 406, and also the pump 408 is downstream of the buffer tank 400. The buffer tank 400 is arranged to store a supply of cleaned water. A water discharge controller 410 is provided for controlling the discharge of cleaned water from the buffer tank 400 to the at least one well head 90 based on a demand signal, for example from a sensor 426 located at the at least one well head 90. The water discharge controller 410 may also be configured to receive a signal from a water level sensor 412 on the buffer tank 400, and to enable the output of any water from the buffer tank 400 only when the measured water level is above a minimum threshold level.

Typically, the fluid separator 42 is configured to remove oil from the water phase whereby the oil content of the water phase exiting the water outlet 54 is lower than 500 ppm by weight, preferably within the range of from 300 to 500 ppm by weight, based on the total weight of the water phase. The oil separator 84 reduces the oil content of the water phase. In particular, the oil separator 84 is configured to separate, for example filter, oil from the water phase whereby the oil content of the cleaned water is lower than 20 ppm by weight, optionally within the range of from 5 to 20 ppm by weight, based on the total weight of the cleaned water.

Such cleaned water, which has not been subjected to an expensive desalination process either, is sufficiently free of residual hydrocarbons that in most, if not all, oil producing countries it is legally and environmentally acceptable to dispose of the cleaned water locally by recycling the cleaned water via a water injection well 90 into the oil field 10, for example for use in an enhanced oil recovery application within the oil field 10. Furthermore, the cleaned water has been pre-pressurised by the pump 86, located upstream or downstream of the oil separator 84, so that the pre-pressurised cleaned water can be effectively pumped into the oil well(s) 90 to achieve enhanced oil recovery, which is a process well known per se to those skilled in the art.

In the preferred embodiments of the present invention, the apparatus 2 is adapted continuously to separate oil, water, gas and solid particles from a continuous flow of a hydrocarbon-containing fluid produced from a plurality of oil well heads 8 in an oil field 10 of an oil and/or gas production facility and simultaneously to provide a continuous flow of the cleaned water to at least one well head 90 of the oil field 10. The solid particle, e.g. sand, cleaning by the solids cleaning system 76 can be carried out in a batch-wise process, but nevertheless the extraction of the hydrocarbon-containing fluid produced from the oil well heads 8, the separation into four constituent phases, and the recycling of the extracted water, after cleaning, back into the its treatment to the oil well head(s) 90 for enhanced oil recovery can be carried out continuously and at the location of the oil and/or gas production facility.

The apparatus and method of the invention can be controlled manually or automatically, for example remotely, so that the desired oil, gas, cleaned water for recycling and solid particles for local disposal are efficiently and reliably produced within the required production and environmental criteria.

As shown in FIG. 1, remote sensor/control systems 200, 202, 204, 206, 208, 210, 212, 214, 216, 218, 220, 222, 224, 226 may be respectively provided on the oil well heads 8, the choke manifolds 20, the downstream valves 22, the second control mechanisms 32, the multiphase flow meter 34, the solids separator 38, the fluid separator 42, the oil outlet 50, the gas outlet 52, the water outlet 54, the solids cleaning system 76, the oil separator 84, the pump 86, and the water injection well head 90. These remote sensor/control systems 200, 202, 204, 206, 208, 210, 212, 214, 216, 218, 220, 222, 224, 226 may be wirelessly connected to a control room 228 from which the various components of the apparatus may be monitored and controlled.

For example, the remote sensor/control system 200 on the oil well heads 8 can comprise pressure and/or temperature and/or flow sensors that transmit real-time data to the control room 228 comprising a wireless transmitter/receiver 230 and a control and monitoring system 232. The choke manifolds 20 can be remotely controlled, for example based on the sensor measurements. The choke manifolds 20 can be remotely controlled using the remote sensor/control system 202.

The remote sensor/control systems 204, 206 on the downstream valves 22 and the second control mechanisms 32 can be controlled to provide a single bulk flow, in a production mode, to the solids separator 38 from the oil well heads 8. The bulk flow can comprise the sum of the output of any of the plurality of oil well heads 8 which have been turned on by the respective downstream valves 22, at a pressure regulated by the respective choke manifolds 20. In other words, any selected oil well head 8 may be independently turned ON or OFF and the output flow of the oil well heads 8 can be co-mingled to provide a combined, unitary bulk flow at the input 4 of the solids separator 38.

Such control of the oil well heads 8 to provide a single bulk flow may be achieved with, or without, using any sensor, or measurement, functionality of the remote sensor/control systems 200 on the oil well heads 8, the remote sensor/control systems 202 on the choke manifolds 20, and the remote sensor/control systems 204, 206 on the downstream valves 22 and the second control mechanisms 32.

For example, the operation of the oil well heads 8, the choke manifolds 20, the downstream valves 22 and the second control mechanisms 32 to provide a desired single bulk flow may be achieved without using any sensor, or measurement, functionality of the remote sensor/control systems 200, 202, 204, 206 but may be controlled manually.

Alternatively, the operation of the oil well heads 8, the choke manifolds 20, the downstream valves 22 and the second control mechanisms 32 to provide a desired single bulk flow may be controlled remotely using a preset algorithm or operation schedule, or remotely by using measurement inputs from elsewhere in the apparatus 2 or from sensors/measurements elsewhere in the oil and/or gas production facility.

As described above, a bulk flow into the solids separator from a desired number and identity of oil well heads 8 can be achieved manually or automatically, by remote control or by pre-programming.

The present invention further provides apparatus and an associated method which significantly enhances the efficiency of monitoring the output of the plurality of the well heads 8 in the oil field 10. The monitoring output can be used dynamically to control the operation of the plurality of the well heads 8 to ensure optimized efficiently and processability of the output of the plurality of the well heads 8.

Accordingly, additionally or alternatively to the bulk flow, a test flow can be switched to bypass the bulk flow and to flow through the multiphase flow meter 34, which enables the phase constituents and other properties of the multiphase hydrocarbon-containing fluid to be monitored, to generate phase data, without pausing production and without requiring an expensive, delicate and complicated multiphase flow meter 34 from being installed on each wellhead line.

The operation of the oil well heads 8, the choke manifolds 20, the downstream valves 22 and the second control mechanisms 32 can be controlled so that dynamic testing of the output of a single well head 8 can be conducted by the multiphase flow meter 34 while the output of the other well heads 8 is co-mingled into the bulk flow which is processed by the separation and cleaning system. The selection of any given well head(s) 8 to enable their respective output to the be tested by the multiphase flow meter 34 can be carried out by remote control, for example on demand or by using a preset testing protocol.

For example, a preset testing protocol may arrange for the operation of the oil well heads 8, the choke manifolds 20, the downstream valves 22 and the second control mechanisms 32 to be controlled so that dynamic testing of the output of the plural well heads 8 is carried out according to a preset program, for example preset sequence, e.g. a first well output is tested, then a second well output is tested, etc. and/or according to preset time periods, for example each well output is tested once a month, or at least one well, in a serial testing programme, is tested once a week. Any desired testing protocol may be selected or utilized.

Whichever testing protocol is utilized, the present invention can achieve enhanced manual or automated testing of the production output of a plurality of oil wells which can promptly minimize the undesired operation of inefficient or non-productive wells as a result of the well output being dynamically tested.

For example, if the multiphase flow meter 34 detects at a given point in time that the output of a given well has an excessive aqueous phase, the output of that well can be immediately choked back, preferably automatically, to minimise the proportion of the undesired phase(s) in the co-mingled output flow from the plurality of wells. Such individual control of a single less-productive well can be efficiently, quickly and reliably achieved using the output data of the single multiphase flow meter 34 as a control parameter while the output of the other well heads 8 is continuously co-mingled and fed into the solids separator 38.

Figure 5:
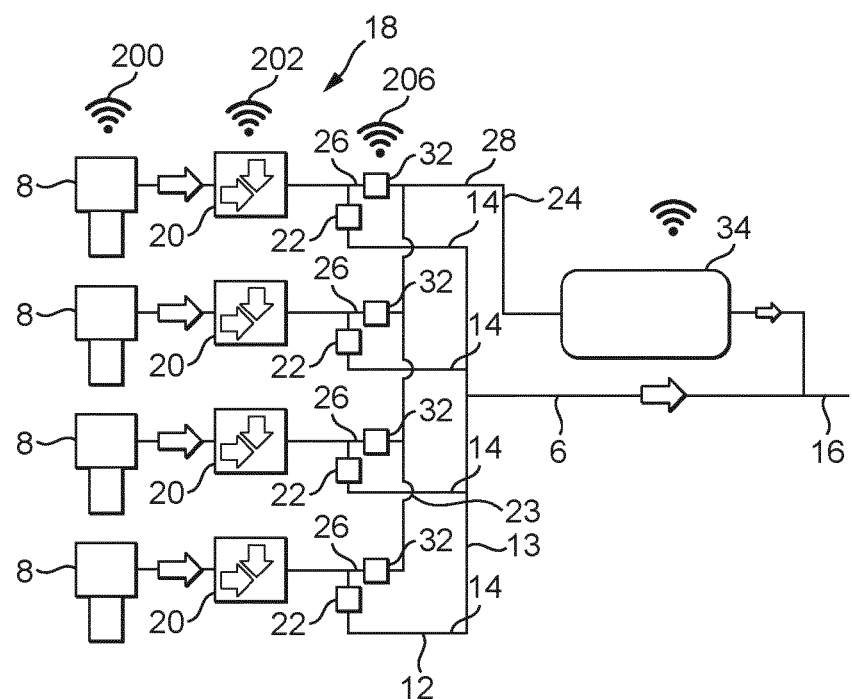
FIG. 5 schematically illustrates a plan view of an apparatus for treating a multiphase hydrocarbon-containing fluid in an oil and/or gas production facility in accordance with a further embodiment of the present invention.

In an alternative embodiment, as shown in FIG. 5, the configuration of the oil well heads 8, the choke manifolds 20, the downstream valves 22, the second control mechanisms 32, the multiphase flow meter 34 and the common downstream pipeline 16 can be coupled to any other apparatus for processing, storing or transporting the co-mingled flow.

In other words, although one aspect of the present invention relates to the separation and cleaning of the output of plural oil wells, nevertheless a third aspect of the present invention relates to co-mingling and dynamic in-line testing of the output of plural oil wells, prior to any other operation on the oil field output.

In any of the aspects of the present invention, the multiphase flow meter 34 may be a multiphase flow meter which can only measure the flow of fluid phases, i.e. liquid (including an oil phase and an aqueous phase) and gas phases, and cannot measure the flow of a solid phase, for example a sand phase. In that case, the sand phase may be separated from the fluid phases upstream of the multiphase flow meter and analysed, for example in a laboratory, as described hereinabove. By using such a multiphase flow meter 34, the composition of a three phase (oil, water and gas phases) hydrocarbon-containing fluid can be analysed in-line and dynamically, and the amount or proportion of each phase can be determined in real time. In addition to the multiphase flow meter 34, for any given oil well the amount (e.g. weight) of sand can be independently measured in real time using the conventional additional auxiliary sand sensor 35 to determine the flow rate of sand from the respective oil well at that particular point in time or by using the weight sensor to determine the weight of solids produced per unit time and also per unit of produced fluid as described previously.

The test flow is also directed into the solids separator 38 after passage through the multiphase flow meter 34. The remote sensor/control system 208 can output the measurements of the multiphase flow meter 34. The second control mechanisms 32, together with the respective downstream valves 22, at a pressure regulated by the respective choke manifolds 20, can be configured to direct the flow from one or more desired oil well heads 8.

The result is that a single multiphase flow meter 34 can be used in a highly versatile manner at low installation and operational costs to monitor the phase distributions of a plurality of wellhead outputs. The data output of the single multiphase flow meter 34 can be used to enhance the efficiency and effectiveness of the downstream operations, in particular the separation of the multiphase hydrocarbon-containing fluid into its constituent individual phases and the cleaning of both the solids and water phases to minimise environmental problems and costs, and even to provide a lower costs continuous supply of recycled cleaned water for simultaneous use in and enhanced oil recovery operation in the same oil field.

The remote sensor/control systems 210, 212 can control, and output the measurements of various parameters in, the solids separator 38 and the fluid separator 42, for example hydrocarbon content, weight of solids particles collected, absolute and relative volumes of the oil and water phases, etc.

The output rates, and associated parameters, of the gas, oil and water outputs from the fluid separator 42 can be controlled and measured by the remote sensor/control systems 214, 216, 218 respectively. The batch functioning of the solids cleaning system 76 and the composition of the output cleaned solids can be controlled and measured by the remote sensor/control system 220.

The remote sensor/control systems 222, 224 can control and output the measurements of various parameters in the oil separator 84 and pump 86. The flow rate of cleaned water into the water injection wellhead(s) 90 can be monitored by remote sensor/control systems 226.

The remote sensor/control system 210 on the solids separator 38 may be configured to measure the solid particle content of the remaining multiphase hydrocarbon-containing fluid that is fed to the fluid separator 42 and to send a signal to the control and monitoring system 232 which can then control the output of the solids separator 38 which enters the fluid separator 42, to provide a solids content below the desired threshold.

The remote sensor/control system 220 on the solids cleaning system 76 may be configured to measure the residual oil content of cleaned solid particles and to send a signal to the control and monitoring system 232 which can then control the output of the solids cleaning system 76 so that the hydrocarbon content of the cleaned solid particles exiting the first output is lower than the desired threshold.

The remote sensor/control system 212 on fluid separator 42, the remote sensor/control systems 218, 222, 224 on the water cleaning and recycling system 82, and/or the remote sensor/control systems 226 at the oil well head 90, may be configured to measure the residual oil content of cleaned water and to send a signal to the control and monitoring system 232 which can then control the output of the water cleaning and recycling system 82 so that the oil content of the cleaned water is lower than the desired threshold.

Various modifications to the present invention may be made by the person skilled in the art of oil and gas phase without departing from the scope of the present invention as defined in the appended claims.

The invention claimed is:

1. An apparatus for treating a multiphase hydrocarbon-containing fluid in an oil and/or gas production facility, the apparatus comprising:
   (a) an inlet for a multiphase hydrocarbon-containing fluid comprising oil, water, gas and solid particles to be separated into its constituent oil, water, gas and solid phases, wherein the inlet is connected to a first pipe network configured to be connectable to a plurality of oil well heads in an oil field;
   (b) a separation system comprising:
   (i) a solids separator in fluid communication with the inlet, the solids separator being configured to separate solid particles from the multiphase hydrocarbon-containing fluid to provide separated solid particles and a remaining multiphase hydrocarbon-containing fluid;
   (ii) a solids outlet connected to the solids separator such that the solid particles separated by the solids separator from the multiphase hydrocarbon-containing fluid can be removed from the separation system through the solids outlet;
   (iii) a fluid separator in fluid communication with the solids separator and arranged to receive the remaining multiphase hydrocarbon-containing fluid, the fluid separator being configured to separate the remaining multiphase hydrocarbon-containing fluid into an oil phase, a water phase and a gas phase;
   (iv) an oil outlet connected to the fluid separator such that the oil phase can be removed from the separation system through the oil outlet;
   (v) a gas outlet connected to the fluid separator such that the gas phase can be removed from the separation system through the gas outlet; and
   (vi) a water outlet connected to the fluid separator such that the water phase can be removed from the separation system through the water outlet;
   (c) a solids cleaning system connected to the solids outlet, wherein the solids cleaning system is configured to clean deposits of residual oil from the solid particles separated by the solids separator to provide cleaned solid particles and first residual oil, the solids cleaning system having a first output for outputting the cleaned solid particles and a second output configured to output the first residual oil, wherein the second output is configured to recycle the first residual oil to the fluid separator; and
   (d) a water cleaning and recycling system connected to the water outlet, wherein the water cleaning and recycling system is configured to clean residual oil from the water phase separated by the fluid separator, the water cleaning and recycling system comprising an oil separator for separating the residual oil from the water phase to provide cleaned water and second residual oil, the oil separator having a third output for recycling the cleaned water to at least one water injection well head of the oil field, wherein the third output comprises a second pipe network configured to be connectable to the at least one water injection well head of the oil field, and a fourth output configured to output the second residual oil, wherein the fourth output is configured to recycle the second residual oil to the fluid separator.

2. An apparatus according to claim 1 wherein the water cleaning and recycling system further comprises a pump, wherein the pump is arranged to supply the water phase to an output end of the second pipe network, the output end being connectable to the at least one water injection well head, at a water pressure within a pressure range of from 100 to 5000 psi.

3. An apparatus according to claim 1 further comprising a buffer tank located between the oil separator and the output end of the second pipe network, the buffer tank being arranged to store a supply of cleaned water, and a water discharge controller for controlling the discharge of cleaned water from the buffer tank to the at least one water injection well head based on a demand signal.

4. An apparatus according to claim 1 wherein the solids separator and the fluid separator are physically separate units connected by a pipeline between a fluid outlet of the solids separator and a fluid inlet of the fluid separator.

5. An apparatus according to claim 4 wherein the fluid separator comprises:
   a separation tank, the separation tank comprising the fluid inlet at an upstream side of
   the separation tank;
   a first reservoir for containing an oil/water liquid mixture, from the remaining multiphase hydrocarbon-containing fluid, which has been separated from the solid particles separated by the solids separator;
   an upper part of the separation tank being located above the first reservoir for receiving gas separated from the oil/water liquid mixture;
   a second reservoir for containing oil separated from the oil/water liquid mixture, the second reservoir being located downstream of the first reservoir;

a weir at an end of the first reservoir that divides the first reservoir from the second reservoir, the weir being provided to separate oil from the oil/water liquid mixture;

a first liquid outlet of the first reservoir connected to a lower part of the separation tank, wherein the first liquid outlet comprises the water outlet;

a second liquid outlet of the second reservoir connected to the lower part of the separation tank, wherein the second liquid outlet comprises the oil outlet; and the gas outlet connected to the upper part of the separation tank.

6. An apparatus according to claim 1 wherein the solids separator and the fluid separator are physically integrated into a common separation unit.

7. An apparatus according to claim 6 wherein the common separation unit comprises:

a separation tank, the separation tank comprising the inlet at an upstream side of the separation tank;

the solids separator in fluid communication with the inlet;

the solids outlet connected to the separation tank such that solid particles separated by the solids separator from the multiphase hydrocarbon-containing fluid can be removed from the separation tank through said solids outlet;

a first reservoir for containing an oil/water liquid mixture, from the remaining multiphase hydrocarbon-containing fluid, which has been separated from the solid particles separated by the solids separator;

an upper part of the separation tank being located above the first reservoir for receiving gas separated from the oil/water liquid mixture;

a second reservoir for containing oil separated from the oil/water liquid mixture, the second reservoir being located downstream of the first reservoir;

a weir at an end of the first reservoir that divides the first reservoir from the second reservoir, the weir being provided to separate oil from the oil/water liquid mixture;

a first liquid outlet of the first reservoir connected to a lower part of the separation tank wherein the first liquid outlet comprises the water outlet;

a second liquid outlet of the second reservoir connected to the lower part of the separation tank, wherein the second liquid outlet comprises the oil outlet; and the gas outlet connected to the upper part of the separation tank.

8. An apparatus according to claim 1 which is adapted continuously to separate oil, water, gas and solid particles from a continuous flow of a hydrocarbon-containing fluid produced from an oil and/or gas production facility and simultaneously to provide a continuous flow of the cleaned water to the at least one water injection well head of the oil field.

9. An apparatus according to claim 1 wherein the oil separator is configured to separate oil from the water phase whereby the oil content of the cleaned water is lower than 20 ppm by weight, or within the range of from 5 to 20 ppm by weight, based on the total weight of the cleaned water.

10. An apparatus according to claim 1 wherein the fluid separator is configured to remove oil from the water phase whereby the oil content of the water phase exiting the water outlet is lower than 500 ppm by weight, or within the range of from 300 to 500 ppm by weight, based on the total weight of the water phase.

11. An apparatus according to claim 1 wherein the solids separator is configured to remove solid particles from the multiphase hydrocarbon-containing fluid whereby the solid particle content of the remaining multiphase hydrocarbon-containing fluid entering the fluid separator is lower than 1 weight %, or within the range of from 0.5 to 1 weight %, based on the total weight of the remaining multiphase hydrocarbon-containing fluid.

12. An apparatus according to claim 1 wherein the fluid separator is configured to remove water from the oil phase whereby the water content of the oil phase exiting the oil outlet is lower than 2 weight %, or within the range of from 1 to 2 weight %, based on the total weight of the oil phase.

13. An apparatus according to claim 1 wherein the solids separator is configured to separate solid particles from the multiphase hydrocarbon-containing fluid whereby the hydrocarbon content of the separated solid particles exiting the solids outlet is lower than 10 weight %, or within the range of from 5 to 10 weight %, based on the total weight of the separated solid particles.

14. An apparatus according to claim 1 wherein the solids cleaning system is configured to remove hydrocarbons from the separated solid particles to provide cleaned solid particles, whereby the hydrocarbon content of the cleaned solid particles exiting the first output is lower than 1 weight %, based on the total weight of the cleaned solid particles.

15. An apparatus according to claim 1 wherein the first pipe network comprises a primary pipe system comprising a plurality of upstream pipelines, each upstream pipeline being connectable to a respective oil well head, a primary manifold connected to the plurality of upstream pipelines, and a common downstream pipeline connected to the primary manifold, the common downstream pipeline connecting the plurality of upstream pipelines to the inlet, each upstream pipeline comprising a respective first control mechanism to control the flow of the multiphase hydrocarbon-containing fluid along the respective upstream pipeline.

16. An apparatus according to claim 15 wherein the first pipe network further comprises a secondary pipe system comprising a plurality of upstream supply lines, each upstream supply line being connected to a respective upstream pipeline, a secondary manifold connected to the plurality of upstream supply lines, and a common downstream supply line connected to the secondary manifold, the common downstream supply line connecting the plurality of upstream supply lines to the solids separator, each upstream supply line comprising a respective second control mechanism to divert at least a portion of the flow of the multiphase hydrocarbon-containing fluid from the respective upstream pipeline into the respective upstream supply line, and further comprising a multiphase flow meter located along the common downstream supply line for measuring the flow of at least two of the phases of the multiphase hydrocarbon-containing fluid.

17. An apparatus according to claim 16 wherein each first control mechanism comprises an upstream choke manifold for controlling the pressure of the multiphase hydrocarbon-containing fluid from the respective well head, and a downstream valve for closing or opening the respective upstream pipeline.

18. An apparatus according to claim 16 further comprising a control and monitoring system, a first control system for operating the first control mechanism, and a second control system for operating the second control mechanism, and wherein the multiphase flow meter comprises a sensor system arranged to supply phase data to the control and monitoring system, the phase data having been generated by measuring the flow of the at least two phases of the multiphase hydrocarbon-containing fluid, wherein the control and monitoring system is adapted to operate the first control system based on the phase data supplied to the control and monitoring system from the sensor system.

19. An apparatus according to claim 18 wherein the control and monitoring system is adapted to control the first control system, in response to the phase data, by closing one of the upstream pipelines, by operating the respective first control mechanism, wherein the phase data is for the portion of the multiphase hydrocarbon-containing fluid which has passed through the respective upstream pipeline which is closed.

20. An apparatus according to claim 18 wherein the control and monitoring system is adapted to operate the second control system based on a preset program, which preset program includes at least one or both of a preset sequence or a preset time schedule, so that the plurality of upstream supply lines are individually opened to provide a respective diverted flow through the multiphase flow meter.

21. An apparatus according to claim 18 wherein the control and monitoring system is adapted to operate the second control system to provide the diverted flow through the multiphase flow meter from a respective upstream pipeline while simultaneously permitting flow of the multiphase hydrocarbon-containing fluid through at least one of the other upstream pipelines to flow to an outlet of the first pipe network.

22. An apparatus according to claim 21 wherein the control and monitoring system is adapted to operate the second control system to provide the diverted flow through the multiphase flow meter from a respective upstream pipeline, to enable real-time monitoring of the composition of the multiphase hydrocarbon-containing fluid diverted into the common downstream supply line, while simultaneously causing a continuous flow of the multiphase hydrocarbon-containing fluid through at least one of the other upstream pipelines to the outlet of the first pipe network.

23. An apparatus according to claim 18 further comprising a respective sensor system on each upstream pipeline, wherein each sensor system is adapted to measure at least one or both of pressure and temperature of the multiphase hydrocarbon-containing fluid at the respective oil well head, and wherein the sensor systems are coupled to the control and monitoring system, and the control and monitoring system is adapted to operate the first and/or second control systems based on input data from the sensor systems.

24. An apparatus according to claim 18 which is adapted continuously to monitor in real-time a first continuous flow of a multiphase hydrocarbon-containing fluid, wherein the first continuous flow which is monitored is the output of a single oil well head in an oil field comprising a plurality of oil well heads, and simultaneously, while the output of the said single oil well head is being monitored, to provide a second continuous flow of the multiphase hydrocarbon-containing fluid to the output, wherein the second continuous flow comprises a co-mingled flow from plural oils well heads in the oil field other than the said single oil well head that is being monitored.

25. An oil and/or gas production facility incorporating the apparatus of claim 1, wherein the first pipe network is connected to a plurality of oil well heads in an oil field and the second pipe network is connected to at least one well head of the oil field.

* * * * *